(12) United States Patent
Martinson et al.

(10) Patent No.: US 7,388,537 B2
(45) Date of Patent: Jun. 17, 2008

(54) RADAR DETECTOR WITH REDUCED EMISSIONS

(75) Inventors: Glen D. Martinson, Oakville (CA); Marian Mark Burin, Mason, OH (US); Feliks K. Lisowski, Willowdale (CA)

(73) Assignee: Escort Inc., West Chester, OH (US)

( * ) Notice: Subject to any disclaimer, the term of this patent is extended or adjusted under 35 U.S.C. 154(b) by 395 days.

(21) Appl. No.: 11/251,558

(22) Filed: Oct. 14, 2005
(Under 37 CFR 1.47)

(65) Prior Publication Data
US 2008/0007444 A1    Jan. 10, 2008

(51) Int. Cl.
*G01S 7/292* (2006.01)

(52) U.S. Cl. .................. 342/20; 342/100; 342/175; 342/198

(58) Field of Classification Search ............ 342/20, 342/89, 98–100, 175, 198; 455/227, 228
See application file for complete search history.

(56) References Cited

U.S. PATENT DOCUMENTS

| | | | |
|---|---|---|---|
| 4,571,593 A * | 2/1986 | Martinson | 343/783 |
| 4,630,054 A * | 12/1986 | Martinson | 342/20 |
| 4,939,521 A * | 7/1990 | Burin | 342/20 |
| 5,068,663 A | 11/1991 | Valentine et al. | |
| 5,446,923 A * | 8/1995 | Martinson et al. | 455/330 |
| 5,473,332 A * | 12/1995 | James et al. | 342/159 |
| 5,659,319 A * | 8/1997 | Rost et al. | 342/36 |
| 5,856,801 A | 1/1999 | Valentine et al. | |
| 5,900,832 A | 5/1999 | Valentine et al. | |
| 6,049,302 A * | 4/2000 | Hinckley, Jr. | 342/99 |
| 6,087,977 A * | 7/2000 | Rost | 342/93 |
| 6,400,305 B1* | 6/2002 | Kuhn | 342/20 |
| 6,693,578 B1* | 2/2004 | Martinson | 342/20 |
| 7,027,833 B1* | 4/2006 | Goodman | 455/553.1 |
| 2008/0007444 A1* | 1/2008 | Martinson et al. | 342/20 |

FOREIGN PATENT DOCUMENTS

GB    2431307 A  *  4/2007

* cited by examiner

*Primary Examiner*—John B Sotomayor
(74) *Attorney, Agent, or Firm*—Wood, Herron & Evans, LLP (57) ABSTRACT

A radar detector includes features to reduce emissions such as those typically generated by the detector's local oscillator. Two low noise amplifiers (LNA's), operating in X band and a combined K/Ka band, respectively amplify X and K/Ka band signals from separate antennae, and deliver those signals over separate, elongated and narrow signal paths to X and K/Ka mixers, where those signals are mixed with local oscillator (LO) signals to produce IF for detection. The elongated, narrow signal paths from the antennae to the mixers reduce LO emissions, and those emissions are further reduced by incorporating radar absorbers between the circuit board and detector case along the antenna-mixer path, including radar absorptive paint on the circuit board itself along this path, and sealing the case with a conductive sealing gasket.

21 Claims, 10 Drawing Sheets

RADAR DETECTOR WITH REDUCED EMISSIONS

FIELD OF THE INVENTION

The present invention relates to detectors for detecting police radar signals.

BACKGROUND OF THE INVENTION

Police traffic surveillance devices emit an electromagnetic signal in the radio frequency (RF) band or light band (i.e., infrared, visible, and ultraviolet light) that reflect off of approaching or departing vehicles to determine their speed. In particular, a change in frequency (Doppler shift) or a change in time of travel for return signal pulses is sensed for calculating vehicle speed. The following RF (radar) frequency bands are used: X-band (10.525 GHz±25 MHz); K-band (24.150 GHz±100 MHz); and Ka-band (34.700 GHz±1300 MHz). Furthermore, laser wavelength of 904 nm with 33 MHz bandwidth is also used.

Police radar and laser detectors ("detectors") are used by drivers of vehicles to detect radiant electromagnetic signals characteristic of police traffic surveillance devices. These detectors are generally a detachable device clipped to a visor or dash of the vehicle for unimpeded sensing of the signals, and for providing a conveniently positioned display and one or more controls to the driver.

Various circuit architectures and techniques have been utilized for the detection of police radar and laser signals, as disclosed in various patents owned by the present assignee and others, and used in products of the present assignee and others. Among these is the circuit architecture shown in U.S. Pat. Nos. 5,900,832 and 5,856,801, which show a radar detector having an antenna coupled to one or more low noise amplifiers (LNA's), providing gain of received signal in a specific police radar band(K, Ka or X). The low noise amplifiers are coupled to a common mixer. A local oscillator signal operating at a K, Ka or X band frequency downmixes the received K, Ka or X band signal to an intermediate frequency for detection. U.S. Pat. No. 5,068,663 discloses a LNA preamplifier only on the X band, coupled to a first mixer, with a passive K/Ka path coupled to a second mixer.

Recently there has been interest in reducing radio emission by detectors. Detectors typically produce radiation as a consequence of the use of a local oscillator in the detector for downmixing received radar signals. Emissions from the local oscillator typically escape the detector by passing through the mixer and into the antenna, and then out the antenna to the surrounding space. Emissions may also propagate directly from the local oscillator circuit through the detector's case into the surrounding space. Even if the case is of metal or other conductive material, emissions may escape through cracks or gaps in the case.

While radar detectors are mobile products and thus not FCC regulated, there have been issues of interference between radar detectors (one detector creating a false signal on another), as well as complaints of VSAT (very small aperture terminal) ground terminal operators about possible interference originating from radar detectors.

While the patents and products heretofore known have disclosed various detector circuit architectures, and those architectures may have exhibited increasing detection performance, there remains significant outward emission of radiation from such detectors, primarily owing to feedthrough from the local oscillator to the antenna and leakage through the case. As to the latter issue, while detectors have been made with metal or conductive cases to form a Faraday cage around the detector circuits, gaps in the case undermine the Faraday cage effect and can permit radiation leakage. The only known approach for sealing gaps in a detector case has been to solder those gaps closed, as implemented by BEL on some of its detectors. This approach may improve the Faraday effect of the case, but at the potential expense of impeding maintenance or upgrading of the detector if either requires opening the case.

Therefore, a significant need exists for a police radar/laser detector that has a reduced radiation signature as compared to those detectors presently available on the market. It is important emission reductions be achieved without compromising detector functions or serviceability.

SUMMARY OF THE INVENTION

This need is met by the present invention, through several aspects of the invention.

In accordance with a first and second aspect of the invention, a plurality of low noise amplifiers (LNA's) are utilized to amplify respective police radar signals. In one aspect the LNA's receive respective radar band signals from two respective antennae. In another aspect, the LNA's deliver the amplified signals, whether received from a common or separate antennae, to two respective band mixers. In the described embodiment, there are two antennae, one operating on the X band, and the other on the K/Ka bands, each feeding an LNA operating respectively in the X and K/Ka band, feeding two mixers respectively operating in the X and K/Ka bands.

An independent aspect of the invention is the use, in the described embodiment, of a single LNA to amplify police radar signals in two different police radar bands, e.g., specifically the use of one LNA to amplify signals in both the K- and Ka-bands.

A further independent aspect of the invention is the use of an LNA in a detector having at least two mixers, for respectively downmixing each of two police radar bands, the LNA supplying amplified signals in a police radar band to one of the mixers.

The use of LNA's in accordance with these aspects of the invention mitigates detector radiation in a number of ways. The use of an LNA on the forward signal path from an antenna to a mixer, works to isolate against reverse propagation of signal from the local oscillator through the mixer to the antenna along the same path. The use of separate antennae for separate bands, permits the use of separate paths from the respective LNA's for those bands to the mixer(s). Each path is required to pass signals at the desired receiving frequencies, while attenuating signals outside of this range. In the disclosed embodiment, this filtering is accomplished with microstrip filters, and the use of separate paths for individual bands, or combination thereof, significantly reduces the filter complexity, and generally increases out of band attenuation, reduces insertion loss, and reduces filter size.

The microstrip filters are effective only for TEM or Quasi TEM signals that propagate in microstrip. It is possible for TE, or TM, waveguide propagation modes to bypass the microstrip filters. In order to mitigate this possibility, the microstrip filters are placed in narrow, enclosed channels that connect the mixer to the antenna. These channels will attenuate TM or TE propagation modes for which the channel width is less than one half wavelength at the frequency of propagation.

Frequencies below which the channel width is less than one half wavelength are said to be in cutoff. The attenuation of signals that are in cutoff depends on how far the signal frequency is below the cutoff frequency, and the length of the channel. To reduce the amount of undesired signal radiated through the channel, the channel is as narrow and long.

Undesired signals arise from the fundamental and harmonic frequencies of local oscillators within the device. For higher harmonics, the channel width may not be narrow enough to maintain cutoff. In general these high frequency harmonics have much lower amplitude. In the disclosed embodiment, additional microwave absorbing materials are placed within the channel for attenuation of TE or TM signals that are above the channel cutoff frequency. This absorbing material is positioned within the channel so they are not in close proximity to any microstrip lines, as this will result in attenuation of desired signals propagating on these lines.

The inclusion of such absorbent material in a radar detector, generally between the circuit board and case of the detector, and in specific embodiments along the path from an antenna to a mixer of the detector, constitutes an independent aspect of the invention. The absorbent material may comprise insulating absorber material that fills space adjacent to the circuit board, or may comprise a thin radar absorbent layer of the circuit board itself, such as a layer of radar absorbent paint on a side of the circuit board opposite to the signal traces.

In another aspect, the invention features the use of a conductive sealing gasket in the detector's circuit board enclosing case. The case is made of shielding conductive material such as metal, in two or more parts, which are sealed together and against radar emissions by a resilient conductive sealing gasket. The use of such a gasket implements sealing against emission without hindering subsequent opening of the case.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1A:
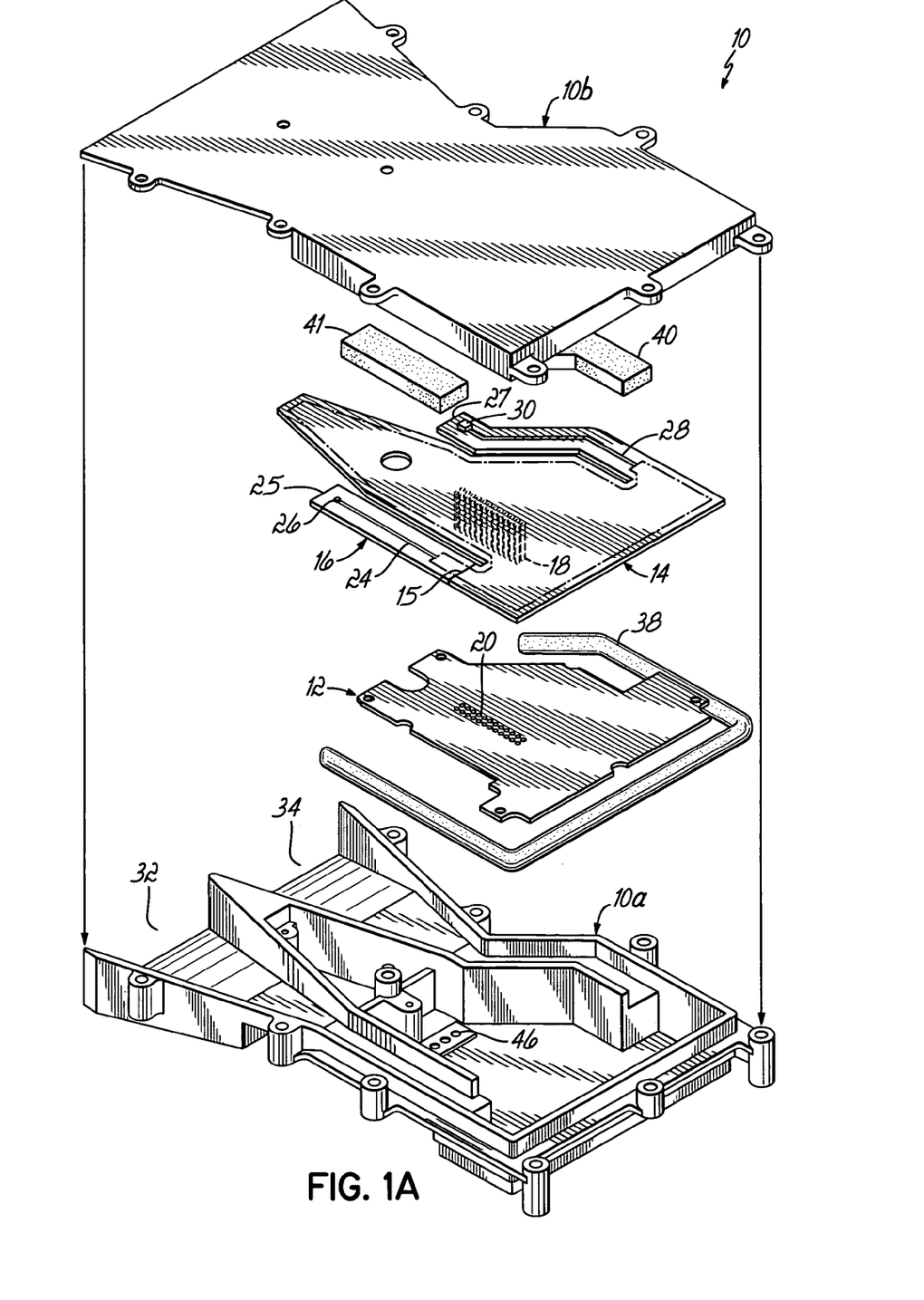
FIGS. 1A and 1B are disassembled perspective views of the RF section of a detector in accordance with principles of the present invention.

Referring to FIG. 1A, a radar detector 10 in accordance with principles of the present invention utilizes a metal or other conductive material case that is formed in two halves 10A and 10B. The case encloses the circuit boards forming the detection circuitry of a radar detector, including a digital circuit board 12, a RF circuit board 14 and a K/Ka band RF circuit board 16. Circuit board 16 is affixed to circuit board 14 by a solder joint 15 between those two boards, that effectively connects the signal traces on board 16 to the signal traces on board 14. Digital board 12 is coupled to RF board 14 by a matrix of pins 18 best shown in FIG. 1B, which insert into a matrix of sockets 20 in digital board 12. K/Ka RF board 16 is formed separately from RF board 14 to permit the use of a different layering on K/Ka board 16, for more optimal conveyance of K/Ka frequency radar signals. Furthermore RF board 14 is formed separately from digital board 12 to similarly permit the use of different layering, and to separate digital signals and their accompanying noise from analog signals.

K/Ka RF board 16 includes an elongated signal path 24 for conveying K/Ka radar signals from an outer end 25 of the board to a mixer and other RF components on RF signal board 16. As will be elaborated in further detail below, a low noise amplifier (LNA) 26 is positioned at an outboard end of board 16 immediately adjacent to an antenna for receiving K/Ka radar signals. Similarly, RF board 14 includes thereon an elongated path 28 for conveying X-band radar signals from an outboard end 27 to a mixer and other RF circuits in the main portion of RF board 14. An X-band LNA 30 is included at the outboard end of RF board 14 for amplifying X-band radar signals received from an X-band antenna and delivering those signals along signal path 28 in the elongated portion of RF board 14, to the mixer in the main portion of RF board 14.

It will be appreciated that the use of the LNA 26 and LNA 30 at the outboard ends of boards 14 and 16 enables the inclusion of an elongated signal path between the antenna and main portion of signal board 14, which might otherwise create losses that would impact signal to noise ratio of the detector. The elongated signal path consists of microstrip filters, and is contained in a narrow shielded channel. The structure of this path is the primary mechanism that results in high attenuation of local oscillator signals and their harmonics as they propagate from the mixer to the antenna, while at the same time allowing received signals to propagate from the antenna to the mixer with minimum attenuation.

K and Ka band signals are received by an antenna horn formed of the upper and lower case portions 10A and 10B in the general area indicated at 32. A cross-sectional view of the antenna horn 32 when the case is assembled can be seen in FIG. 3B. X-band radar signals are received in a similar antenna horn 34 which is also formed by case sections 10a and 10B when they are assembled together.

Included within case sections 10A and 10B are a number of emission reduction features. First, the separate paths for conveying X- and K/Ka band radar signals are relatively narrow, as compared to the width that would be required where a single antenna horn and a single path from the antenna horn to the body of the RF board utilized. The use of narrow paths between the antenna horn in the body of the radar detector case reduces the number of potential radiation paths for local oscillator originated RF signals to escape from the interior of the detector case to free space through the antenna horn 32 or 34.

Figure 1B:
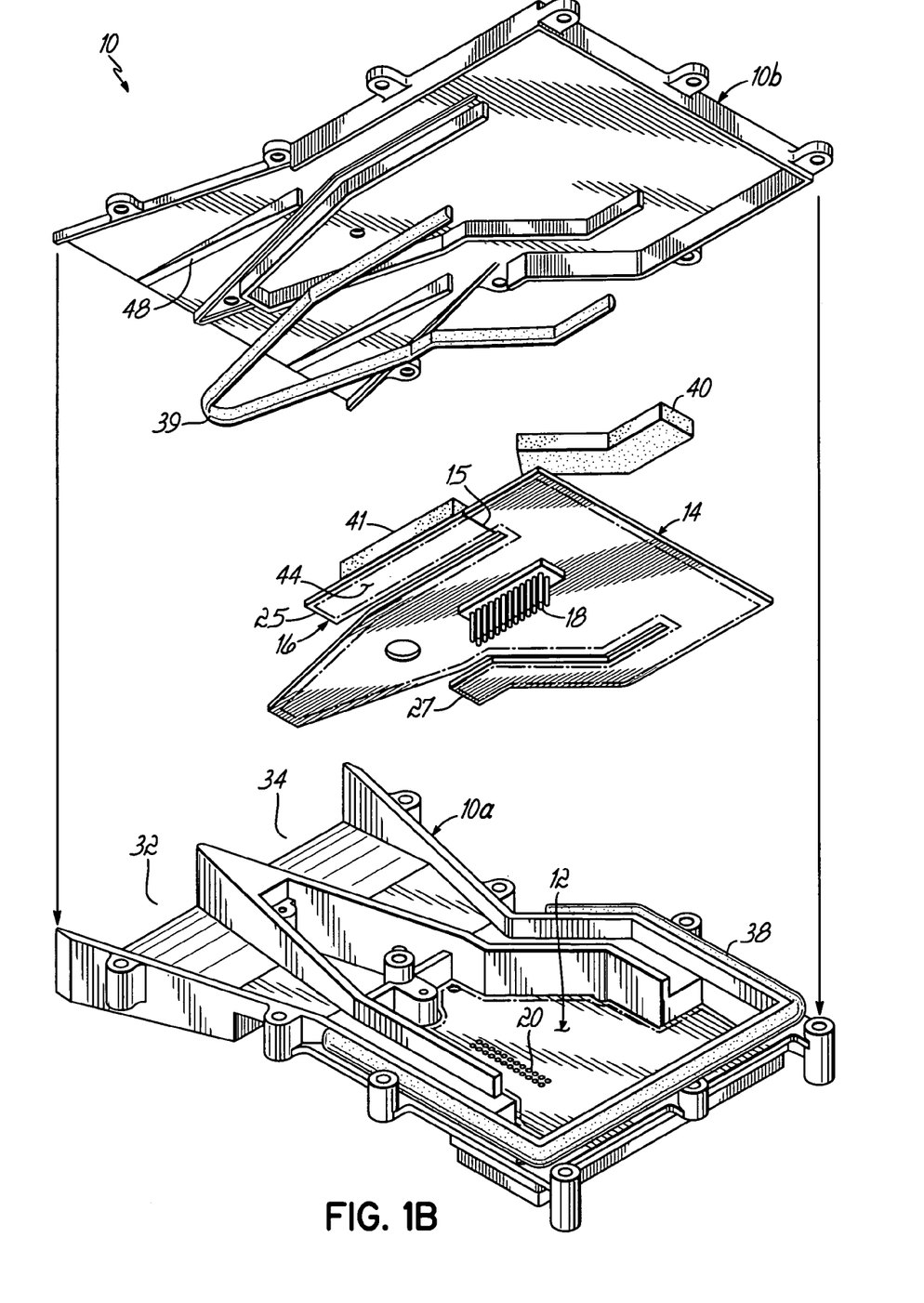
Figure 2A:
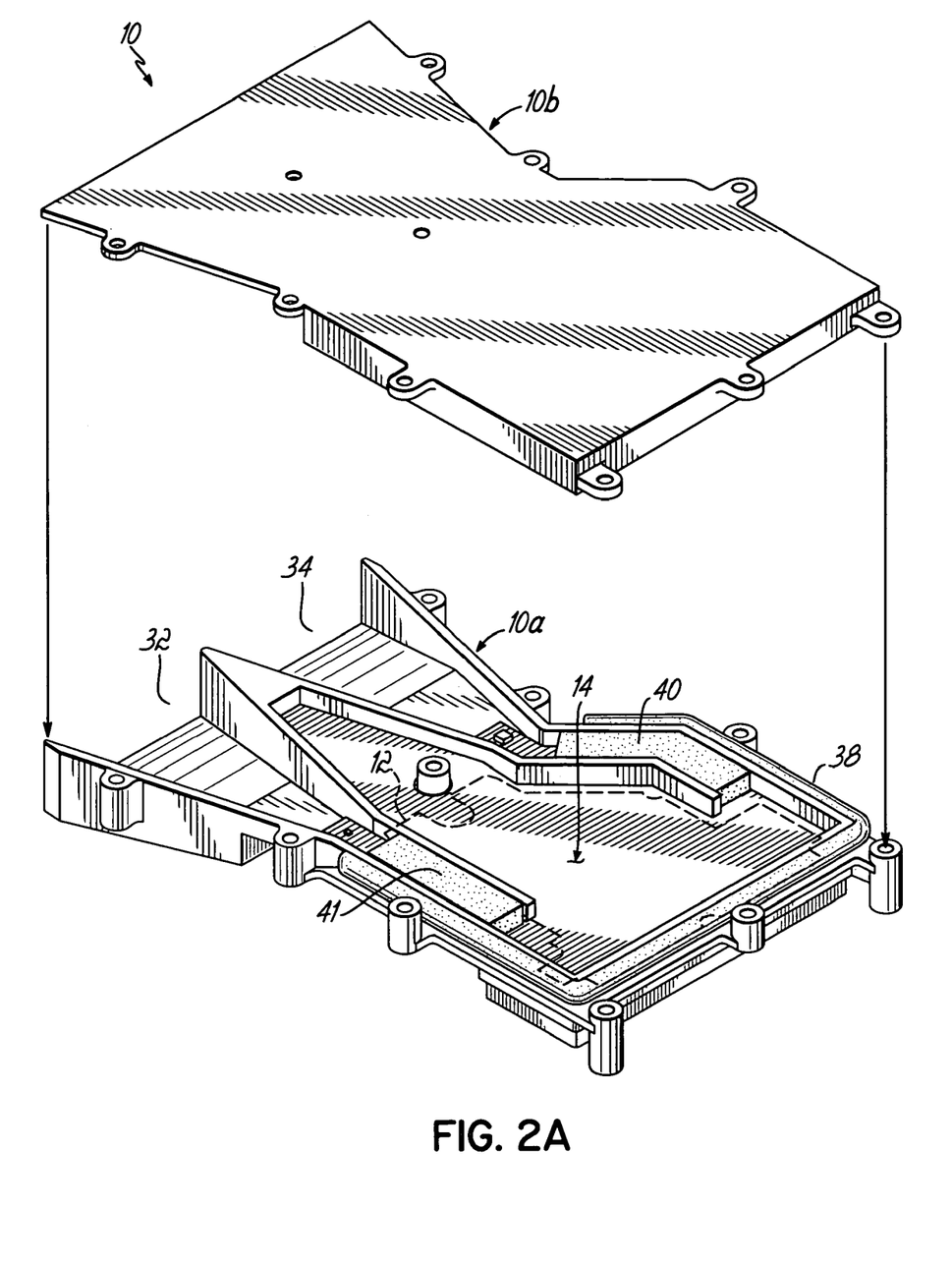
FIG. 2A is a partially assembled perspective view of the RF section of the detector of FIGS. 1A and 1B.
Figure 2B:
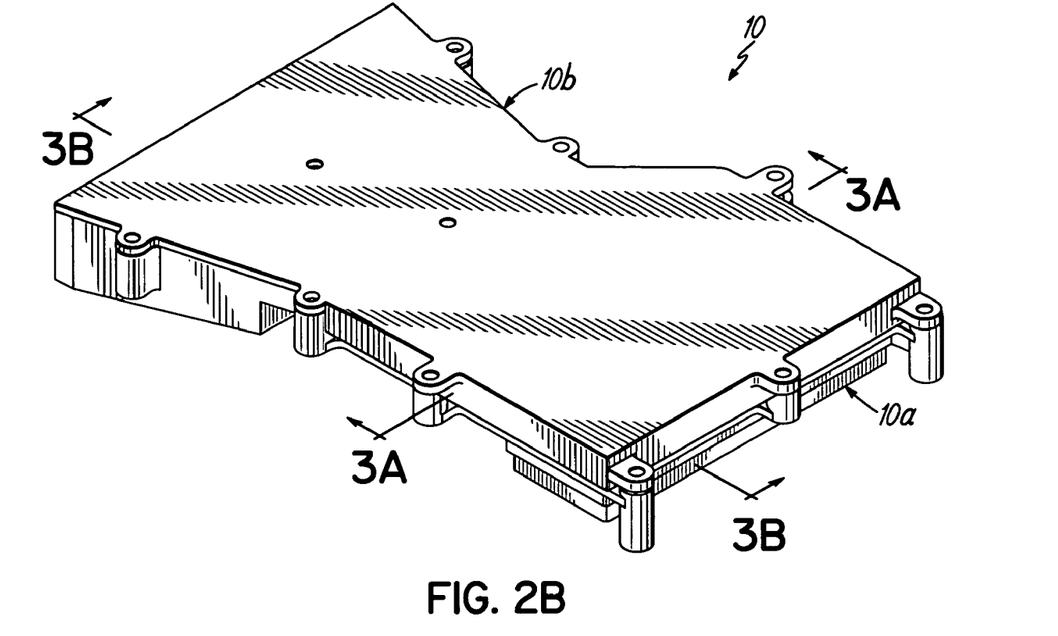
FIG. 2B is a fully assembled perspective view thereof.

A second feature of the detector is conductive sealing gaskets 38 and 39 (gasket 39 is visible in FIG. 1B). Gaskets 38 and 39 are manufactured of a conductively coated flexible material such as rubber, and form an conductive seal between case sections 10A and 10B when assembled together. The conductive enclosure formed by the case sections 10A and 10B once sealed by gaskets 38 and 39 is an effective Faraday Cage shield to prevent radiation from the case to space outside the case through gaps in the joints between the case halves.

A third feature included within the case to increase RF shielding is radar absorbers 40 and 41. Absorbers 40 and 41 are positioned between the circuit boards 14 and 16 and the upper case 10B, as illustrated in FIGS. 1A-1B, 2A, and 3A-3B. The absorber material for absorbers 40 and 41 may be for example Insulation No. 117 available from Emerson & Cumming at 46 Manning Road, Ballerica, Mass. Absorbers 40 and 41 may be selected of a material that is absorptive of RF energy in the particular frequency band utilized by local oscillators within the detector, so that such RF energy will be absorbed as it is transmitted along any path from the main section of circuit board 14 to the antenna horns 32 and 34. Such radiation is not likely to follow along the circuit board traces 24 and 28—which carry signals from low noise amplifiers 26 and 30 to circuit board 14, because the reverse rejection of low-noise amplifiers 26 and 30 is likely to reject any such radiation. However, such radiation may travel along free space paths adjacent to the circuit board, and accordingly absorbers 40 and 41 fill those free space paths so as to absorb radiation attempting to pass through those free space paths, thus reducing radiation reaching antenna horns 32 and 34 and radiating into free space outside of the detector.

It will be appreciated that very small wavelength, i.e., high frequency radiation may be emitted through very small gaps, if such gaps are allowed to exist in a radar detector assembly. For the purposes of eliminating such gaps, a further step may be taken to insert radar absorptive material into the detector. Specifically, circuit board 14 or circuit board 16 may be manufactured with a layer of absorptive material that fills gaps between circuit board 14 or 16 and case 10A or 10B or absorbers 40 and 41. As noted above, circuit board 14 and circuit board 16 are formed separately because they have different layer technology. Circuit board 14 is a four-layer board having a 30 mil total thickness, e.g. four layers spaced eight mils apart surrounded by upper and lower layers of approximately three mils. If emissions were found to be traveling between the layers in such a board, those intermediate layers may be formed of a nonconductive radar absorptive material so as to substantially attenuate such emissions. Circuit board 16 is formed with a different layer technology, specifically circuit board 16 comprises a single layer 8 mm thick board. The 8 mm thickness of circuit board 16 is selected for effective conveyance of K/Ka band radar signals; an 8 mil dielectric separation between the top trace and underside ground plane is a suitable thickness to form a microstrip transmission line to propagate radar signals in a K/Ka band efficiently, and any additional layers in circuit board 16 beneath this single 8 mil layer would form a waveguide capable of conveying emissions in a reverse direction from RF board 14 to antenna horn 32, and thus there are no such layers. However, the gap that is typically formed between circuit board 16 and lower case 10A may be of a sufficient size to form a waveguide to convey such radiation from RF board 14 to antenna horn 32. To prevent such radiation, a radar absorptive layer may be included on the bottom side of circuit board 16 in the area 44 illustrated in FIG. 1B. This radar absorptive layer may be formed by a layer of microwave absorbing paint such as the MF 500 microwave absorbing coating available from Millimeter Wave Technology Ink, 90 Dayton Avenue Suite 6E, Passiac, N.J. Inclusion of a layer of absorptive material in area 44 reduces the ability of any waveguide formed between board 16 and lower case 10A to carry local oscillator RF signals from the interior of the detector to antenna horn 32.

Figure 3A:
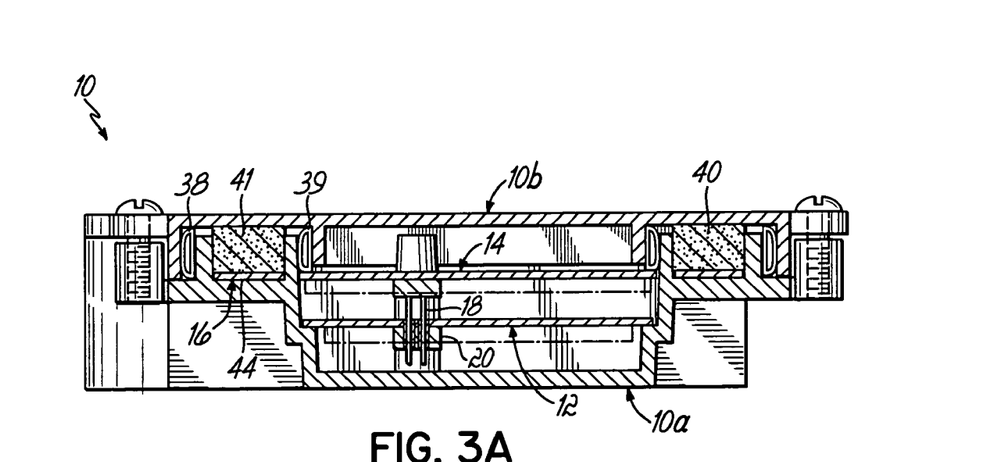
FIG. 3A is a cross-sectional view of the assembled RF section of FIG. 2B showing the circuit board positions therein and K/Ka and X band signal paths.
Figure 3B:
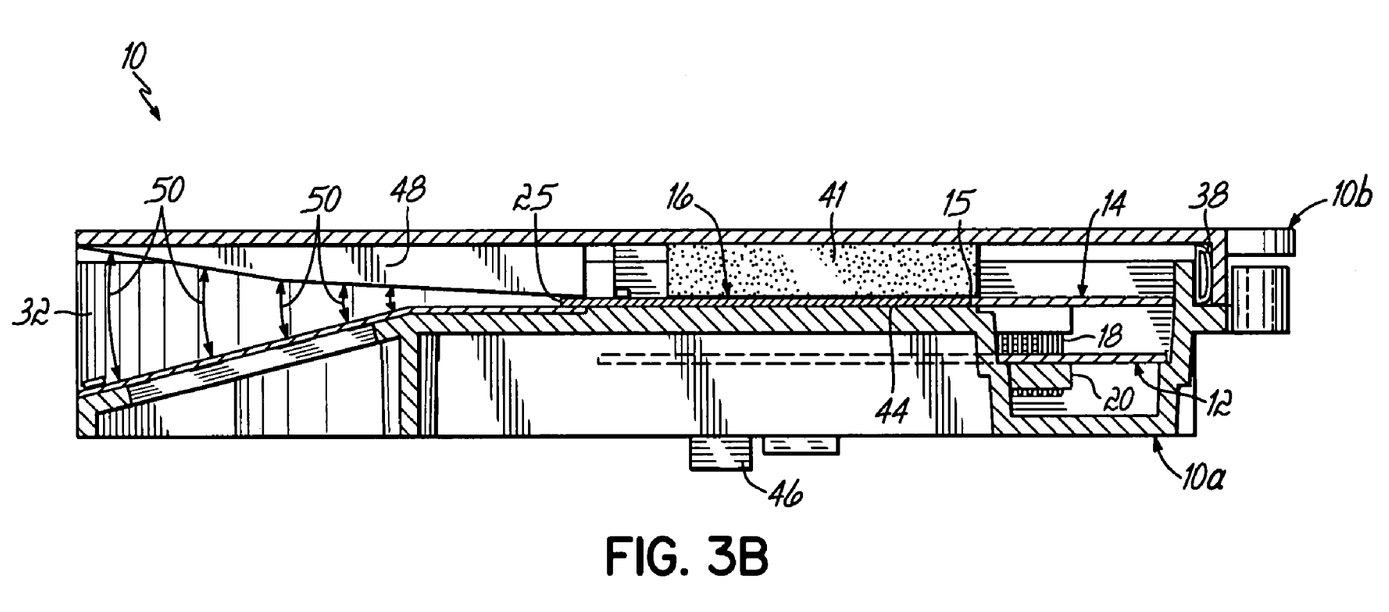
FIG. 3B is a cross-section view of the assembled RF section of FIG. 2B showing the circuit board positions therein and the K/Ka signal path.

Referring now to FIGS. 3A and 3B, further details of the assembled appearance of the detector RF section can be explained. As seen in FIG. 3A, when assembled circuit boards 12 and 14 are stacked together inside of the case 10A and 10B, they are connected by pins 18 inserted into holes in connector 20. A further connector on board 12 is used to make connections outside the case, by conductors passing through an orifice 46 on the lower surface of casing section 10A. Such connections may be used to couple further circuitry to the RF section as discussed below with reference to FIG. 4.

Inside of casing 10A, 10B, it can be seen that gaskets including gasket 38 form a tight electrically conductive seal between sections 10A and 10B, enclosing the circuitry on circuit boards 12, 14 and 16. Absorbers 40 and 41 effectively fill the entirety of the casing surrounding the elongated section of circuit board 14 carrying the single path 28 and the entire length of circuit board 16, although the absorbers 40 and 41 do not touch the microstrip lines in the elongated sections of boards 14 and 16.

In FIG. 3B, it be seen that the antenna horn includes a ridge 48 coupling received microwave signals captured by antenna horn 32 to the traces on circuit board 16. The characteristic impedance of free space, approximately 300 ohms, is effectively matched to the 50 ohm characteristic impedance of the microstrip trace on circuit board 16 by the combined effect of ridge 48 and antenna horn, which channels electric field along the flux paths 50 illustrated in FIG. 3B.

Figure 4:
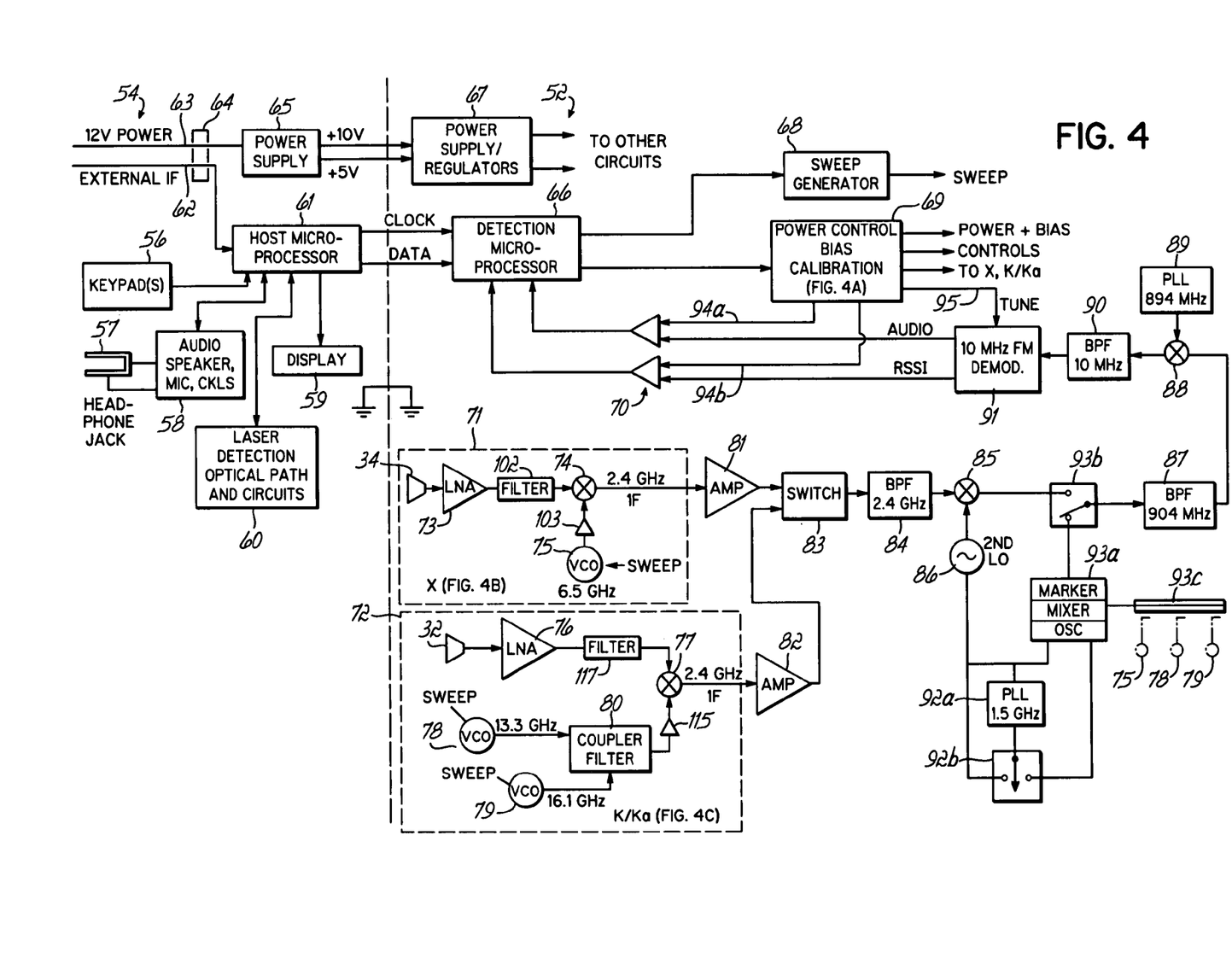
FIG. 4 is an overall block diagram of a detector utilizing principles of the present invention.

Referring now to FIG. 4, the overall arrangements of electrical parts and components in a radar detector in accordance with the principles of the present invention may be explained. As seen generally in FIG. 4, the radar detector includes an RF section 52 and a control section 54. Control section 54 is enclosed in an external housing, surrounding the shielded case shown in the previous FIGS. That external housing may be made of plastic or other nonconductive or semi-conductive materials to the components of control section 54 do not emit significant radiation. The external housing has a keypad 56 comprising a number of buttons or keys that a user may use to control the radar detector, including controlling its functions, sensitivity settings, on-off state, and other typical functionality. The external housing further has a headphone jack 57 connected to an audio circuit 58. Audio circuit 58 includes a speaker and an audio circuit for driving headphone jack 57 in case the driver desires to connect the radar detector to a car audio system for audible alerts. The audio system 58 may also contain a microphone for detecting ambient noise levels within the vehicle and/or for receiving voice commands for controlling the radar detector. The external housing further contains a display 59 for providing status displays and information to users of the radar detector. Further details of various displays that may be created by a radar detector are disclosed in U.S. Pat. No. 5,668,554 the entirety of which is hereby incorporated herein.

The external housing of the radar detector further encloses an optical system 60 for laser detection. Laser detection is explained in greater detail in U.S. Pat. No. 5,206,500 which is hereby incorporated herein in its entirety.

Keypad 56, audio circuit 58, display 59 and laser circuitry 60 are all controlled by host microprocessor 61 which has overall control over the operation of the radar detector. Microprocessor 61 is further connectable through an external interface jack 62 to send or receive control signals from external devices. For example, host microprocessor 61 may control external sensors or external server signal emitters that are part of a radar detection system.

Operating power for the radar detector is provided by a 12-volt power connector 63 which may be on a common jack 64 with the external interface 62. A power supply circuit 65 supplies power to electrical circuits in the control side of the radar detector and provides five and ten volt power supply lines to the RF section 52 through a five-pin connector coupling control section 54 to RF section 52. Host microprocessor 61 is coupled through a clock and data connection to a detection microprocessor 66 within RF section 52. Detection microprocessor 66 is powered by power supply regulator 65 which receives power from the external power supply. Power supply regulators 65 and 67 supply power to circuits in RF section 52.

The detection microprocessor 66 is responsible for controlling each of the components of the RF section of the detector. These include a sweep generator 68 which generates a sweep control signal which is delivered to voltage controlled oscillators to perform a frequency sweep to search radar bands for police radar signals. Microprocessor 66 also controls a variety of power control and bias calibration circuits 69 which are responsible for providing power and controlling calibration of the analog receiver circuits of the radar detector. Further details on the power control and bias calibration circuitry 69 are provided in FIG. 4A below.

Detection microprocessor 66 is responsive to digitized signals from an analog detector 70, which essentially comprises dual comparators which operate at thresholds that are controlled by the microprocessor 66. Microprocessor 66 performs digital signal processing upon that digitized signal to determine the presence of police radar signals. Schemes for detecting police radar signals are disclosed in detail in the art, such as in U.S. Pat. No. 6,836,238 and other U.S. patents that are incorporated by reference into U.S. Pat. No. 6,836,238, all of which are hereby incorporated by reference herein. The following explanation of the demodulation of police radar signals is provided for context to explain aspects of the present intention relating to reduction of emissions by a radar detector.

The detector disclosed herein includes a separate X-band detection section 71 and K/Ka detection section 72. Further details on section 71 are provided in FIG. 4B below and further details on section 72 are provided in FIG. 4C below. In broad overview, X-detection section 71 includes horn antenna 34, and a low-noise amplifier 73 connected thereto, which amplifies X-band microwave signals and delivers them via stripline filters 102 to a X-band mixer 74. Mixer 74 receives a 6.5 GHz local oscillator signal from a local oscillator 75 via a buffer amplifier 103 that includes filtering circuitry. This local oscillator signal is swept through a frequency range in response to the sweep signal of sweep generator 68. Mixer 74 produces an output signal as a consequence of mixing incoming X-band radar with the local oscillator signal. This output signal is an intermediate frequency at approximately 2.4 GHz. It will be appreciated that the X band local oscillator signal is filtered aggressively to remove second harmonics thereof, because mixer 74 provides dominant mixing of the local oscillator signal and incoming radar signals at twice the local oscillator frequency. Assuming the mixer is driven from a pure sinusoidal local oscillator signals, and the mixer diodes are matched, only the odd harmonics of the oscillator frequency will appear across the diode, and since the dominant mixing mode is at twice the local oscillator frequency, signals at the mixer as a result of the local oscillator drive can be removed because they differ from the frequency of the dominant mixing action by an amount equal to the local oscillator frequency or multiples thereof, producing an intermediate frequency signal at the difference frequency between 10.525 GHz and 13.0 GHz.

K/Ka band section 72 is similar in architecture to X-band section 71. Here, K or Ka band microwave signals are received by an antenna 32 and amplified by a low-noise amplifier 76 and delivered via stripline filters 117 to a mixer 77. Mixer 77 also receives either a K band or Ka band local oscillator frequency, from one of local oscillator 78 or local oscillator 79. The outputs of local oscillators 78 and 79 are coupled through a coupler and filter 80, and a buffer amplifier 115, to mixer 77. As discussed above, mixer 77 has a predominant mixing action at twice the local oscillator frequency, and therefore K band radiation at 24.15 GHz mixed with the local oscillator 78 at 13.3 GHz, and Ka band radiation at 34.7 GHz mixed with local oscillator 79 at 16.1 GHz, produce an an intermediate frequency signal at 2.4 GHz at the output of mixer 77.

Power control and bias calibration circuits 69, control power to low-noise amplifier 73 and 76, mixer 74 and 77 and local oscillator 75, 78 and 79. With these power connections, the radar detector is controlled so that only one band of radiation is sampled any given time. That is, an X-band sweep is done by activating low-noise amplifier 73, mixer 74 and local oscillator 75, while all elements in the K/Ka band section 72 are in the dormant state. K-band radiation is sampled by leaving all elements in the X-band section 71 in a dormant state and applying power to only low-noise amplifier 76, mixer 77, local oscillator 78 and buffer amplifier 82. Ka-band radiation is detected by returning local oscillator 78 to dormant state and applying power to local oscillator 79.

The 2.4 GHz intermediate frequency outputs from X-band section 71 and K/Ka band section 72 are delivered through low noise amplifiers 81 and 82, respectively, and through a switch 83 to a 2.4 GHz band pass filter 84. This band pass filtering removes undesired mixer products of the incoming signals, leaving only a 2.4 GHz band of potential police radar signals. The output of band pass filter 84 is delivered to a mixer 85 which receives a 1.5 GHz signal from the second local oscillator 86. Under normal operating conditions, local oscillator 86 is controlled by a phase locked loop circuit 92*a*, connected to local oscillator 86 via switch 92*b*, to maintain a frequency of 1.5 Ghz. In this normal operating condition, the output signal from mixer 85, which includes the police radar signals at a difference frequency of approximately 900 MHz, is delivered via switch 93*b* to a band pass filter 87 which removes all other aliases created by mixer 85. The output band pass filter 87 is then delivered to a mixer 88 which also receives a phase locked 894 MHz signal from phase locked loop circuit 89. The resulting 10 MHz band of police radar signal is delivered to band pass filter 90 which removes all other components other than the 10 MHz window potentially containing police radar signals. This 10 MHz signal is then delivered to an FM demodulator circuit 91 of the type commercially available and typically used in radar detectors. The resulting audio band signal is delivered to a comparator of the analog detector 70, where it is digitized and delivered to detection microprocessor 66. The received signal strength indicator (RSSI) output of the demodulator 91 is also fed to a comparator of detector 70, and the digitized result is delivered to microprocessor 66. Microprocessor 66 controls the thresholds applied to the comparators of analog detector 70, to establish a minimum received signal strength and minimum audio signal.

The circuitry of FIG. 4 further includes connections for calibration of frequency sweep applied to the local oscillators 75, 78 and 79. During calibration, switches 92b and 93b are controlled so that switch 93b connects the output of a marker circuit 93a (rather than the output of mixer 85) to band pass filter 87, and switch 92b connects PLL 92a to marker circuit 93a (rather than to local oscillator 86). A microstrip 93c is coupled to the outputs of oscillators 75, 78 and 79 to capture the frequency of those oscillators (only one oscillator is active at any given time), and deliver that frequency into marker circuit 93a. Marker circuit 93a comprises a mixer and oscillator. When calibration is being performed, the oscillator of marker circuit 93a is controlled by PLL circuit 92a via switch 92b, so that marker circuit 93a mixes the controlled frequency from its oscillator with the frequency from local oscillator 75, 78 or 79, and delivers the resulting intermediate frequency via switch 93b to band pass filter 87. Through further demodulation as discussed above, microprocessor may detect can calibration the sweep applied to local oscillators 75, 78 and 79.

Figure 4A:
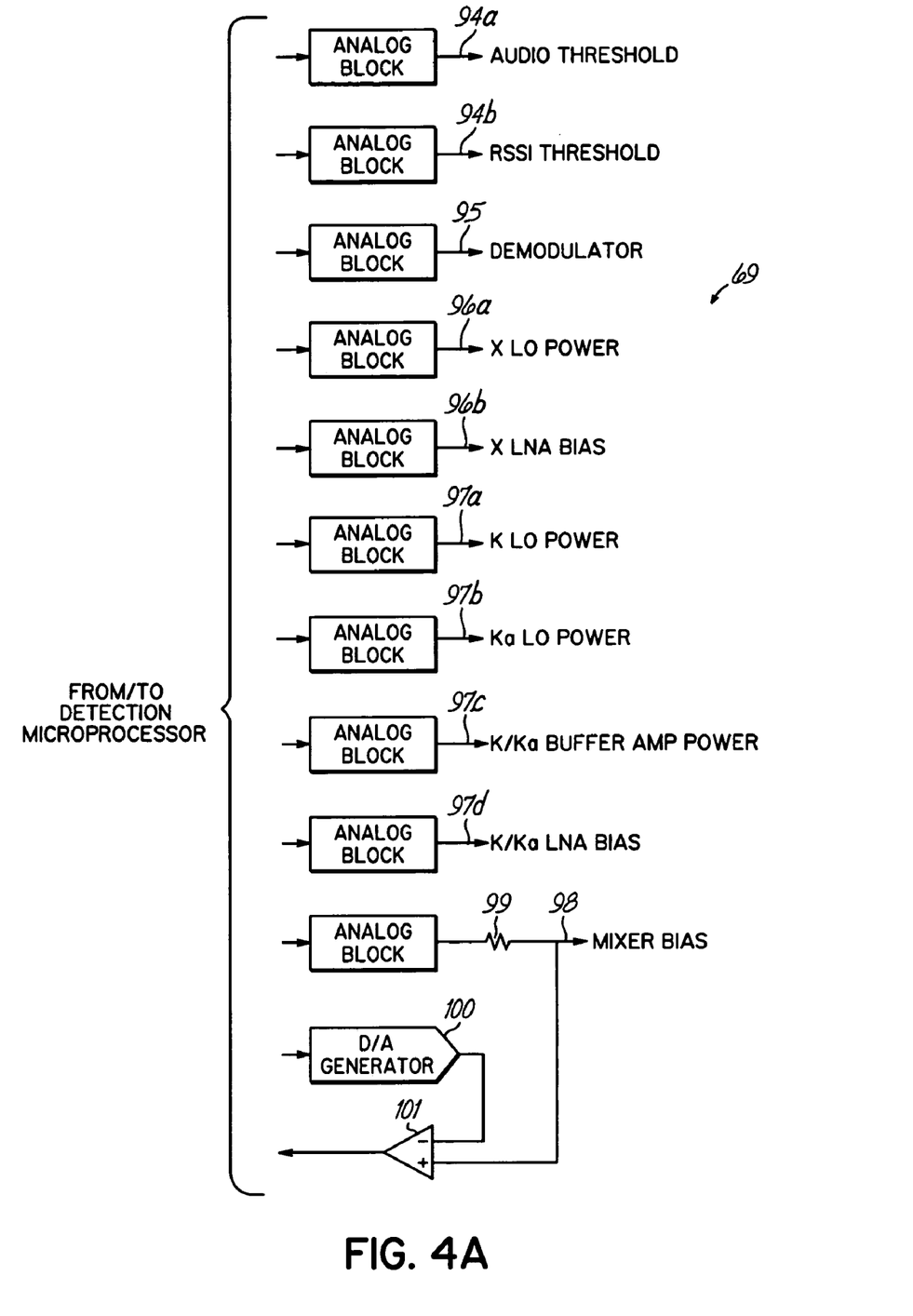
FIG. 4A is a block diagram of the bias calibration and power control circuitry of the detector of FIG. 4.

Referring to FIG. 4A, the blocks of power control and bias calibration circuit 69 can be further elaborated. The power control signals generated under command of detection microprocessor 66 are produced by various analog blocks shown in FIG. 4A. Controlling the comparators of analog detector 70, are an audio threshold signal on line 94a which is delivered to a first comparator of detector 70, and an RSSI threshold signal on line 94b which is delivered to a second comparator of detector 70. Controlling the demodulator 91 is a tuning signal on line 95. Controlling X-receiver section 71 are an X-local oscillator power signal on line 96a and X low-noise amplifier bias signal on line 96b. Controlling the K receiver section 72 are a K local oscillator power signal on line 97a, a Ka local oscillator power signal on line 97b, a K/Ka buffer amplifier power signal on line 97c and a K/Ka low-noise amplifier bias signal on line 97d.

A mixer bias signal on line 98 is utilized to optimize the LO power applied to the mixers in order to achieve minimum mixer conversion loss. This optimization technique is applied to both the X and K/Ka band mixers. Specifically a digital to analog converter generates a constant current that is applied to the mixer diode while it is driven by a local oscillator signal. The DC voltage across the diode mixer in response to this current is a function of the local oscillator power. The LO power may be varied by changing supply voltage on the LO buffer amplifier, or the supply voltage on the LO itself. The LO power is varied until a predetermined DC voltage across the mixer diode is achieved. The presence of this voltage indicates that the LO power is at the optimum value to minimize mixer conversion loss. Once the LO power has been optimized the bias current is removed for signal detection purposes. Further details on this aspect of the circuitry may be found in U.S. Pat. No. 6,693,578 of the present assignee, which is hereby incorporated herein in its entirety.

The calibration routine takes the following form. Micowave signal reception is discontinued and a mixer bias current is injected on line 98 into the diode mixer of one of the X or K/Ka sections. The optimal mixer bias voltage is generated by digital to analog converter 100 and compared to the mixer voltage by comparator 101. The local oscillator amplitude is then adjusted by adjustment of the outputs on a respective line 97a, 97b or 96a to bring the mixer bias measured on line 98 to the desired level. This calibration routine may be performed when the detector is turned on or on a periodic basis during operation of the detector to maintain optimal mixer calibration over time.

Figure 4B:
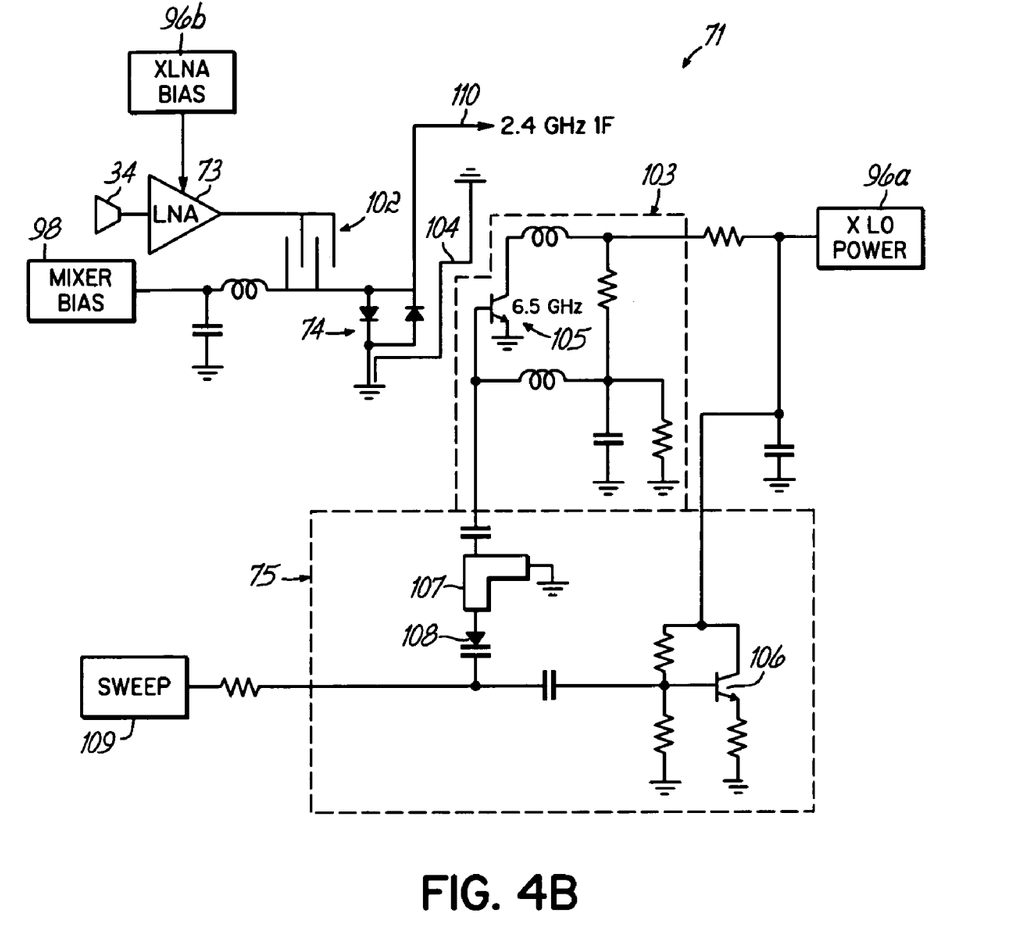
FIG. 4B is a block and schematic diagram of the X band receiver circuitry of the detector of FIG. 4.

Referring to FIG. 4B, details of the X-band receiver section 71 may be explained. Within X-band section 71, signals from the antenna horn 34 are amplified by a low-noise amplifier 73, which is activated and by an X LNA bias control signal on line 96b, which is delivered at a calibrated voltage selected to optimize the noise figure of the LNA according to its design specifications. The amplified X-band signal is coupled through an X band microwave band pass filter 102 to a diode mixer 74. Filter 102 provides image rejection at mixer 74. Mixer 74 also receives a local oscillator signal coupled by line 104 from a strip line resonator oscillator 75. Line 104 also provides band pass filtering to remove harmonics of the local oscillator signal. This is important for suppression of local oscillator second harmonic radiation that would otherwise be radiated via the X band antenna to outside of the detector.

Oscillator 75 includes a high frequency transistor 106 and a resonant structure built around microstrip line 107, varactor diode 108, as well as other parasitic components. The oscillator frequency is controlled by a sweep voltage from 109 applied to varactor diode 108. This sweep voltage causes the varactor capacitance to change thereby changing the resonant frequency of the structure comprised of the varactor diode and other components. Oscillator 75 is operable in response to power supplied by the X LO power signal on line 96a. A filtering buffer amplifier 103, built around a high frequency transistor 105, delivers local oscillator signal to diode mixer 74. Mixer 74 produces a 2.4 GHz intermediate frequency output on line 110 in response to X-band signals received by horn antenna 34 in the second harmonic of the resonant frequency of resonator 75.

Figure 4C:
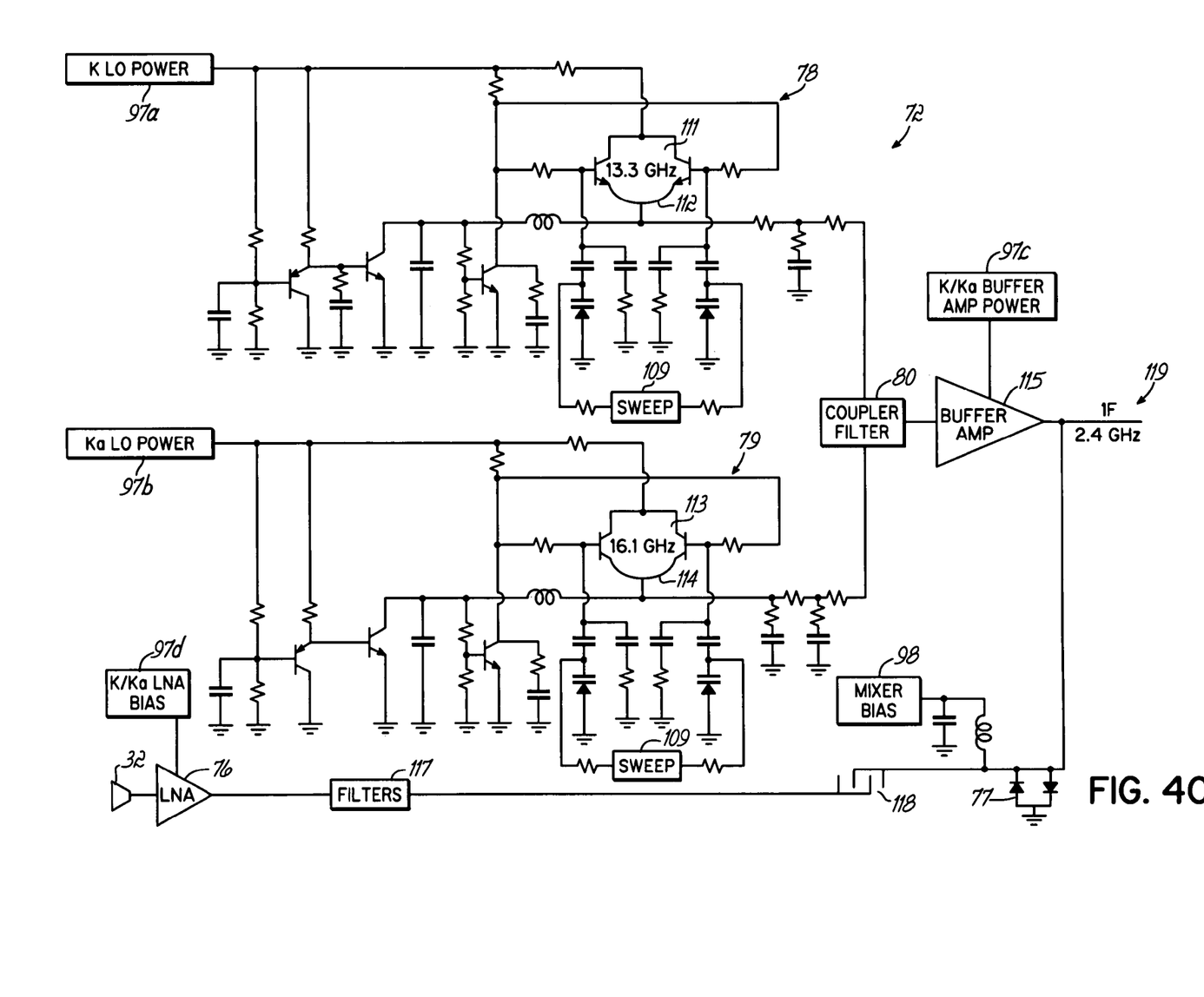
FIG. 4C is a block and schematic diagram of the K/Ka band receiver circuitry of the detector of FIG. 4.

Referring now to FIG. 4C, details of the K and Ka receiver section 72 may be explored. The K-band local oscillator 78 is activated by a K local oscillator power signal on line 97a and consists of a "push-push" oscillator, including transistor pair 111. Transmission line 112 must have an electrical length greater than one quarter wavelength, but less than one half wavelength, for all frequencies of oscillation, the wavelength being measured from the output point to the transistor emitter. The oscillator resonant circuit is comprised of the tuning varactor capacitance, parasitic inductances associated with the varactors and circuit board traces, and the input capacitance at the base of the oscillator transistors. Details on a "push-push" resonator architecture such as the one utilized in FIG. 4C may be found in U.S. Pat. No. 5,402,087 which is hereby incorporated herein in its entirety. The varactor capacitance is adjusted by the sweep signal on line 109 thereby adjusting the frequency of the oscillator resonant circuit of which the varactor diode is a component.

The Ka-band local oscillator 79 is a similar architecture and includes a oscillator 113 operating at a 16.1 Ghz frequency, a transmission line 114, and a sweep signal on line 109 from sweep generator 68. The Ka-band local oscillator is activated by the Ka local oscillator power signal on line 97b.

The swept 13.3 GHz signal (when K local oscillator 78 is activated) or the swept 16.1 GHz local oscillator signal (when Ka local oscillator 79 is activated), is delivered through coupler/filter 80 to a buffer amplifier 115. (In an alternative embodiment, filtering may be provided at the output of buffer amplifier 115 to suppress local oscillator harmonic frequencies generated in the buffer amplifier 115.) Buffer amplifier 115 is activated whenever a K-band or Ka-band sweep is being performed by the radar detector, by providing power to the buffer amplifier through line 97c. The output of buffer amplifier is delivered to diode mixer 77 of construction similar that described above with reference to FIG. 4B. Diode mixer 77 mixes at twice the frequency of the local oscillator from section 78 or 79 with a police radar signal captured by horn antenna 32 and amplified by low noise amplifier 76 and filtered by filters 117. A coupler 118 couples police radar signals to the mixer 77, producing a 2.4 GHz intermediate frequency output as shown at a 119.

Figure 5:
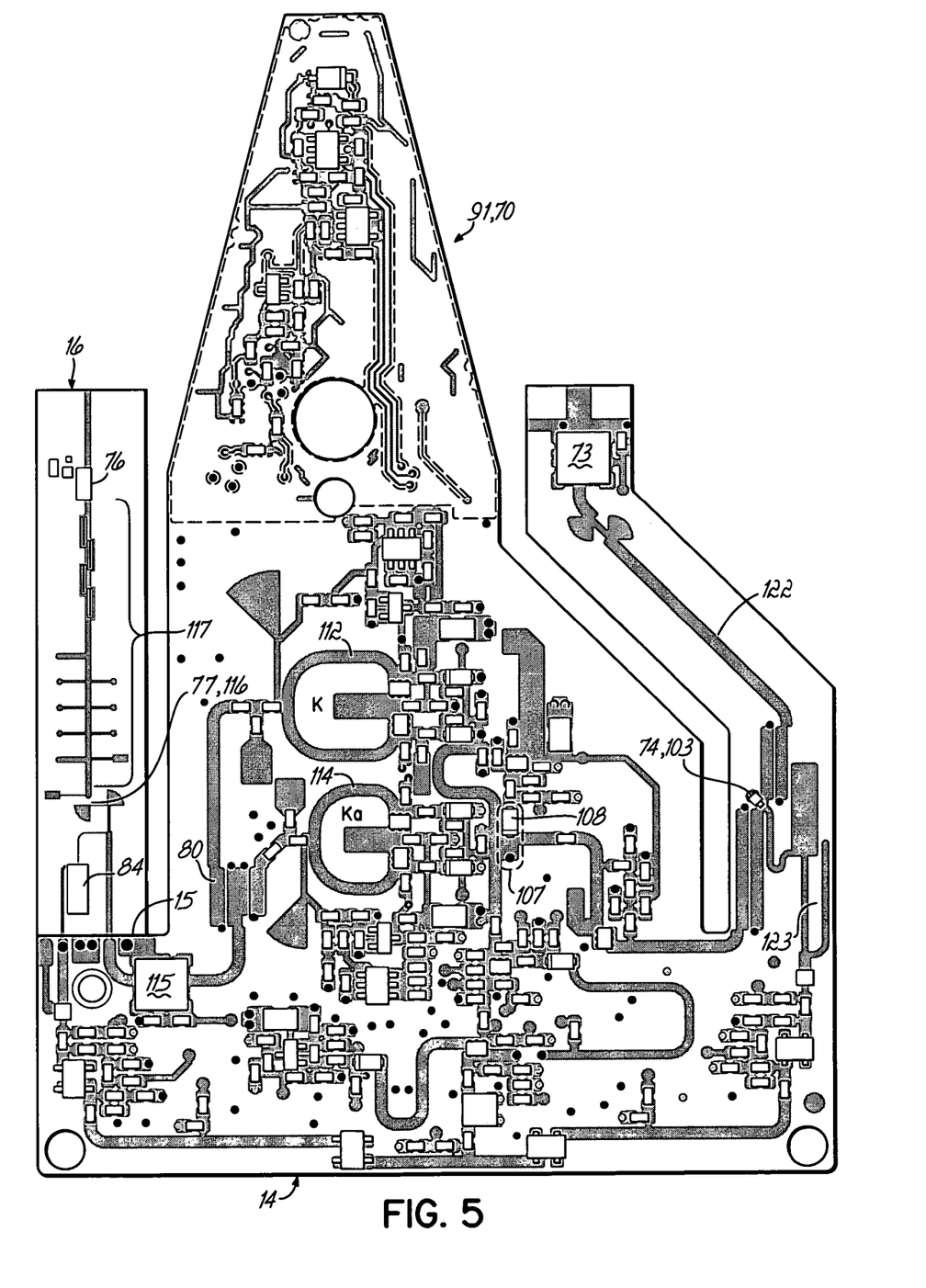
FIG. 5 circuit board trace diagram of the circuit board of a detector implementing the RF reception functions of the detector of FIG. 4, for fitting within the assembly of FIGS. 1A-3A.

Referring now to FIG. 5, the layout on circuit boards 14 and 16 of the elements reviewed in the previous FIGS., may be elaborated. A seen in FIG. 5, circuit board 16 carries on an outboard end, a wire bonded chip comprising low-noise amplifier 76, and a series of printed microstrip filtering elements comprising filters 117 shown in FIG. 4C. The K band local oscillator transmission line 112 can be seen in the central section of board 14, and the Ka band transmission line on 114 may be seen adjacent thereto, each of which is greater than one quarter wavelength for any frequency of oscillation in use. The coupler 80 and buffer amplifier 115 are also identified in FIG. 5, as is the location on circuit board 16 of diode mixer 77. Intermediate frequency signals generated by mixer 77 are delivered through a low pass filter 84 and then to circuit board 14 for intermediate frequency processing.

The intermediate frequency circuitry generally elaborated with reference to FIG. 4, comprises a substantial fraction of the circuitry on circuit board 14, including components on the illustrated side of the board, and the underside thereof. The trapezoidedly shaped section of circuit board 14 constitutes primarily the 10 MHz demodulator 91 and detection circuitry 70 of FIG. 4.

The X-band low-noise amplifier 73 is included in the leadless plastic package located at the outboard end of circuit board 14. X-band filtering is performed by various microstrip filters as indicated at 122. An X-band mixer 74 and intermediate frequency filtering 123 can also be seen on circuit board 14 on the right side thereof. The resonant strip line 107 and varactor 108 may also be seen on circuit board 14.

As noted previously, the circuit architecture implemented by the present invention, using low-noise amplifiers and separate elongated paths for X-band and K/Ka band radiation, permits effective shielding of emissions from the local K/Ka and X-band local oscillator from internal circuit boards 14 and 16 in two ways. First, the use of long narrow paths between horn antenna 32 and 34 in the remaining circuits reduces emission, and the use of microwave absorptive buffers along potential radiation paths, as described in previous FIGS., further improves shielding. It will be noted in FIG. 5 that diode mixers 74 and 77 are located remote from the antenna horns, a practice which normally would result in unacceptable signal-to-noise ratio for very faint radar signals, but can be done in conjunction with the use of a low-noise amplifier at the outward end of the circuit board 14 and 16 as is the case in accordance with the present invention. Furthermore, the local oscillators for both the K/Ka and X-bands are well inside the radar detector's shielded casing. Thus the present invention permits high-performance while maintaining low emission of signal from local oscillators internal to a radar detector.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A detector for detecting radar signals in a police radar band, comprising:
   a first antenna receiving radar signals in a police radar band,
   a first low noise amplifier amplifying radar signals received from said first antenna and delivering an amplified radar signal for mixing,
   a second antenna receiving radar signals in a police radar band,
   a second low noise amplifier amplifying radar signals received from said second antenna and delivering an amplified radar signal for mixing,
   a first local oscillator,
   a first mixer mixing a signal from said local oscillator with an amplified radar signal from one of said low noise amplifiers to downmix said amplified radar signal to an intermediate frequency, and
   an intermediate frequency police signal detector receiving a downmixed signal for police activity detection.

2. The detector of claim 1
   wherein said first mixer mixes a signal from said first local oscillator with an amplified signal from said first low noise amplifier, and
   further comprising a second local oscillator and a second mixer, the second mixer mixing a signal from said second local oscillator with an amplified radar signal from said second low noise amplifier to downmixed said amplified radar signal to said intermediate frequency.

3. The detector of claim 2 wherein said first antenna, first low noise amplifier and first mixer receive radar signals in the X band and said second antenna, second low noise amplifier and second mixer receive radar signals in the K and Ka bands.

4. A detector for detecting radar signals in a police radar band, comprising:
   a first low noise amplifier amplifying radar signals in a first radar band,
   a first local oscillator,
   a first mixer mixing a signal from said local oscillator with an amplified radar signal from said first low noise amplifier to downmix an amplified radar signal from said first low noise amplifier to an intermediate frequency,
   a second local oscillator, a second mixer mixing a signal from said local oscillator with a received radar signal in a second radar band to downmix said received radar signal in said second band to said intermediate frequency, and an intermediate frequency police signal detector receiving a downmixed signal for police activity detection.

5. The detector of claim 4 further comprising a second low noise amplifier for amplifying radar signals in said second radar band, and delivering said amplified radar signals in said second band to said second mixer, wherein said first low noise amplifier and second low noise amplifier receive radar signals from a common antenna.

6. The detector of claim 5 wherein said first low noise amplifier and first mixer receive radar signals in the X band and said second low noise amplifier and second mixer receive radar signals in the K and Ka bands.

7. A detector for detecting radar signals in a police radar band, comprising:

a low noise amplifier amplifying radar signals in a first and a second police radar band, and delivering an amplified radar signal for mixing, a local oscillator, a mixer mixing a signal from said local oscillator with an amplified radar signal from said low noise amplifier to downmix said amplified radar signal to an intermediate frequency, and an intermediate frequency police signal detector receiving a downmixed signal for police activity detection.

8. The detector of claim 7 wherein said first and second police radar bands are the K and Ka bands.

9. A detector for detecting radar signals in a police radar band, comprising:

an antenna receiving radar signals in a police radar band, said antenna located at a first end of a signal path, a local oscillator, a mixer mixing a signal from said local oscillator with an amplified radar signal from said low noise amplifier received at a second end of said signal path, to downmix said amplified radar signal to an intermediate frequency, and an intermediate frequency police signal detector receiving a downmixed signal for police activity detection, wherein said signal path is longer than half of the wavelength of radar signals in said police radar band.

10. The detector of claim 9 further comprising a low noise amplifier located at said first end of said signal path, amplifying radar signals in said police radar band received from said antenna and delivering amplified radar signals to said first end of said signal path.

11. The detector of claim 9 further comprising a radar absorber positioned along said signal path.

12. The detector of claim 11 further comprising a housing and a circuit board housed therein, wherein said signal path is a trace on said circuit board and said radar absorber is a filler positioned between said circuit board and said housing along said trace.

13. The detector of claim 11 wherein said signal path is a trace on said circuit board and said radar absorber is a radio absorbing layer on said circuit board.

14. The detector of claim 13 wherein said radio absorbing layer on said circuit board is a layer of radar absorbing paint.

15. A detector for detecting radar signals in a police radar band, comprising:

an antenna receiving radar signals, a housing, a circuit board mounted within said housing and including detecting circuitry detecting police radar signals received by said antenna and also including a local oscillator generating radio frequency signals and a mixer mixing said local oscillator signals with radar signals from said antenna, and a radar absorber positioned within said housing between said local oscillator and said antenna and away from said local oscillator, to absorb at least a portion of said radio frequency signals that would otherwise be emitted from said antenna.

16. The detector of claim 15 wherein said circuit board includes a trace forming a signal path for signal to be transferred from said antenna to said detecting circuitry, and said radar absorber is a filler positioned between said circuit board and said housing along said trace.

17. The detector of claim 15 wherein said radar absorber is a radio absorbing layer on said circuit board.

18. The detector of claim 17 wherein said radio absorbing layer on said circuit board is a layer of radar absorbing paint.

19. The detector of claim 17 wherein said circuit board includes a trace forming a signal path for signal to be transferred from said antenna to said detecting circuitry, and said radio absorbing layer is positioned along said trace.

20. A detector for detecting radar signals in a police radar band, comprising:

an antenna receiving radar signals, a housing having a first and a second part, a circuit board mounted within said housing and including detecting circuitry detecting police radar signals received by said antenna and also generating radio frequency signals, and a conductive gasket positioned between said first and second parts to reduce the emission outside of said housing of radio frequency signals generated by said detection circuitry.

21. The detector of claim 20 wherein said conductive gasket substantially surrounds said detection circuitry.

* * * * *